United States Patent [19]

Kushida et al.

[11] Patent Number: 4,569,869
[45] Date of Patent: Feb. 11, 1986

[54] SATURATED POLYESTER BOTTLE-SHAPED CONTAINER WITH HARD COATING AND METHOD OF FABRICATING THE SAME

[75] Inventors: Hideo Kushida; Akikazu Kosugi, both of Yachiyo; Hiromi Nagayama, Tochigi, all of Japan

[73] Assignee: Yoshino Kogyosho Co., Ltd., Japan

[21] Appl. No.: 263,509

[22] Filed: May 14, 1981

Related U.S. Application Data

[63] Continuation of Ser. No. 95,529, Nov. 19, 1979.

[30] Foreign Application Priority Data

Nov. 20, 1978 [JP] Japan .......................... 53-159691[U]
May 21, 1979 [JP] Japan .................................. 54-62463

[51] Int. Cl.$^4$ .............................................. B65D 11/15
[52] U.S. Cl. ...................................... 428/35; 215/1 C;
427/54.1; 427/412.5
[58] Field of Search .................... 428/35; 215/1 C; 427/54.1, 412.5

[56] References Cited

U.S. PATENT DOCUMENTS

| | | | |
|---|---|---|---|
| 3,567,494 | 3/1971 | Fitko | 427/54.1 |
| 3,922,451 | 11/1975 | Anshutz et al. | 428/35 |
| 3,926,755 | 12/1975 | Marans et al. | 427/54.1 |
| 3,968,016 | 7/1976 | Wismer | 427/54.1 |
| 4,110,187 | 8/1978 | Sloan et al. | 427/54.1 |
| 4,171,056 | 10/1979 | Hannon et al. | 428/35 |

*Primary Examiner*—John Kittle
*Assistant Examiner*—James J. Seidleck
*Attorney, Agent, or Firm*—Parkhurst & Oliff

[57] ABSTRACT

This invention relates to a saturated polyester bottle-shaped container and a method of fabricating the same from a material such as polyethylene terephthalate incorporating high transparency and superior mechanical surface strength. The hard coating is formed by the steps of coating an ultraviolet curable coating of methyl methacrylate resin on the surface of the body and irradiating ultraviolet rays over the surface of the body coated with the hard coating. Thus, the bottle-shaped container can largely enhance the wear resistance and extreme smoothness of the surface to eliminate dirt adherence onto the surface. In a second embodiment, an ultraviolet ray curable coating is coated onto the bottle, followed by a transparent resin coating which is cross linked with the ultraviolet ray curable coating.

4 Claims, 3 Drawing Figures

SATURATED POLYESTER BOTTLE-SHAPED CONTAINER WITH HARD COATING AND METHOD OF FABRICATING THE SAME

This is a continuation of application Ser. No. 95,529 filed Nov. 19, 1979.

BACKGROUND OF THE INVENTION

This invention relates to improvements of a bottle-shaped container and, more particularly, to a saturated polyester bottle-shaped container with hard coating, and a method of fabricating the same from a saturated polyester such as polyethylene terephthalate, which incorporates high transparency and superior mechanical surface strength or hardness.

Since the bottle-shaped container of saturated polyester such as polyethylene terephthalate incorporates superior transparency, small water and gas permeabilities, and non-toxicity, it has a wide range of applications as glass-like transparent container in the fields of toilets, liquid foods, medicines, etc. However, inasmuch as the container has a very low surface hardness, it tends to be easily scratched due to frictional contact among containers during container transportation or the charging contents into the container, thus causing the container to lose its high transparency. It can even be scratched so much on the printed pattern of the surface as to thus cause it to lower the value of commodity.

SUMMARY OF THE INVENTION

It is, therefore, an object of this invention to provide a saturated polyester bottle-shaped container with a hard coating which can eliminate the aforementioned disadvantages of the conventional polyethylene terephthalate bottle-shaped container and can increase mechanical strength or hardness on the surface thereof.

It is another object of this invention to provide a saturated polyester bottle-shaped container with a hard coating which can greatly enhance the wear resistance on the surface thereof to prevent the outer appearance thereof from deteriorating due to fine scratches.

Yet another object of this invention is to provide a polyester bottle-shaped container with a hard coating which can incorporate extreme smoothness on its surface to allow minimal dirt adherence on the surface thereof.

A further object of this invention is to provide a polyester bottle-shaped container with a hard coating which can be very easily fabricated particularly on the hard surface.

Still further object of this invention is to provide a method of fabricating a bottle-shaped container of saturated polyester with a hard coating which can form such a superior hard surface as to cause no scratches even if the container is abraded by stainless steel wool or sharp pencil lead of 3H to 4H on its surface.

Still another object of this invention is to provide a method of fabricating a bottle-shaped container with a hard coating by which a hard surface or coating can be formed without apprehension of thermal deformation of the container even when made of relatively easily thermally deformable saturated polyester.

Still another object of the invention is to provide a method of fabricating bottle-shaped containers, each with a hard coating by mass production.

BRIEF DESCRIPTION OF THE DRAWINGS

The above and other related objects and features of the invention will be apparent from a reading of the following description of the disclosure found in the accompanying drawings and the novelty thereof pointed out in the appended claims:

DETAILED DESCRIPTION OF THE PREFERRED EMBODIMENTS

Figure 1:
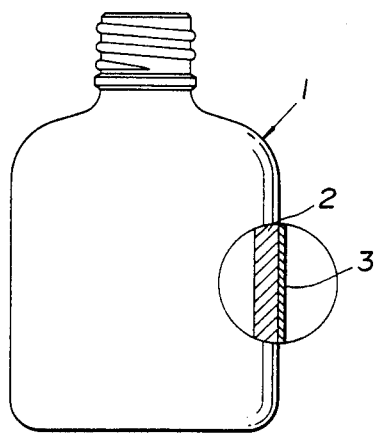
FIG. 1 is a front view partly in enlarged cross section of one preferred embodiment of the saturated polyester bottle-shaped container constructed according to the present invention.

Referring to the drawings, particularly to FIG. 1 showing one preferred embodiment of a saturated polyester bottle-shaped container constructed according to the present invention, wherein like reference numerals designate the same parts in the following view, a bottle-shaped container 1 of saturated polyester such as, for example, polyethylene terephthalate is coated with a hard coating or film 3 formed of an ultraviolet curable coating of methyl methacrylate resin, which will be hereinafter called "MMA resin", on the surface of the container body 2.

The hard coating 3 is formed by the steps of coating ultraviolet curable MMA resin on the surface of the body 2 by suitable means and irradiating ultraviolet rays over the surface of the body 2 coated with the resin to thereby harden the resin.

Figure 2:
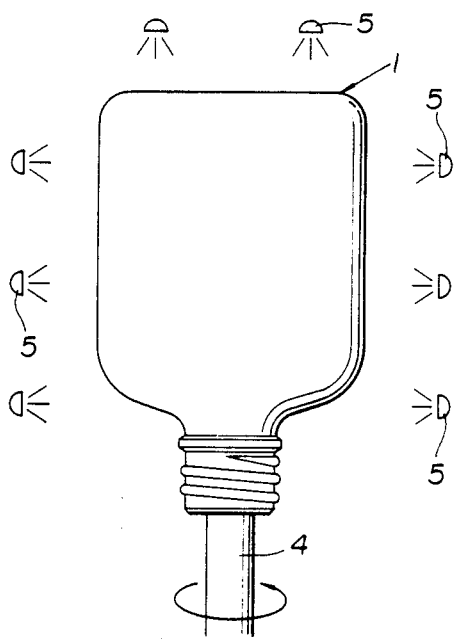
FIG. 2 is a schematic view of the preferred disposition of the bottle-shaped container upon fabricating.

FIG. 2 illustrates the preferred disposition of the bottle-shaped container in the step of hardening the coating on the body. Since it is preferable to substantially uniformly irradiate ultraviolet rays over the surface of the coated body 2, the coated body 2 is assembled at the end of a rotating shaft 4 rotating at predetermined constant speed, and a suitable number of ultraviolet ray lamps 5 are disposed around the body 2 to preferably irradiate the ultraviolet rays over the body 2.

The ultraviolet curable coating forming the coating 3 contains, for example, unsaturated polyester resin, acrylic resin, alkyd resin, modified urethane resin, modified epoxy resin, etc. Those skilled in the art recognize that a modified resin is a mixture of a synthetic and natural resin which may confer special properties to the mixture. For example, the physical properties of a resin may be modified by adding at least one certain additive such as filler or pigment.

The main wavelengths of the irradiated ultraviolet rays are 2,000 to 4,500 Å.

One preferred example of fabricating the bottle-shaped container 1 thus formed will be described below by way of illustration only.

The fabrication of the bottle-shaped container comprises the steps of cleaning the surface of the bottle-shaped container body 2 preformed in predetermined shape, and coating an ultraviolet curable coating of MMA resin on the surface of the bottle-shaped container body 2 thus cleansed.

It further comprises the steps of assembling and rotating the coated bottle-shaped container body 2 at the end of the rotary shaft 4 and irradiating ultraviolet rays from energized ultraviolet ray lamps 5 over the entire surface of the bottle-shaped container body 2 for a predetermined time to thereby form a hard coating 3 of MMA resin on the surface of the bottle-shaped container body 2.

The mechanical strength test results of the surface of the bottle-shaped container 1 thus coated with the hard coating 3 on the surface of the body 2 thereof are shown below.

| | |
|---|---|
| Cellotape separation test: | |
| Bottle-shaped container coated according to the present invention: | Not separated |
| Conventional container: | — |
| Surface hardness test: | |
| Bottle-shaped container of the present invention: | lead of pencil of 3H hard |
| Conventional container: | lead of pencil of H hard |
| Stainless steel wool wear test (20 times by finger pressure): | |
| Bottle-shaped container of the present invention: | Scratches not obvious |
| Conventional container: | Readily obvious scratches |
| Alcoholic test: | |
| Bottle-shaped container of the present invention: | No penetration |
| Conventional container: | — |
| Filter paper wear test (20 times by finger pressure): | |
| Bottle-shaped container of the present invention: | Not scratched |
| Conventional container: | readily obvious scratches |
| Cloth (cotton cloth) wear test (20 times by finger pressure): | |
| Bottle-shaped container of the present invention: | Not scratched obviously |
| Conventional container: | readily obvious scratches |
| Wear test by RCA tester: | |
| Bottle-shaped container of the present invention: | more than 200 times |
| Conventional container: | 5 times |
| Friction test among containers: | |
| Bottle-shaped container of the present invention: | Not obvious scratch |
| Conventional container: | Readily obvious scratches |

Thus, the bottle-shaped container 1 thus fabricated according to the present invention exhibited largely improved mechanical strength and particularly wear resistance on the surface thereof, preventing the deterioration of the surface or external appearance of the bottle-shaped container due to fine scratches.

The surface of the bottle-shaped container 1 thus coated and treated with the ultraviolet curable coating becomes very flat and smooth, making the surface difficult to contaminate.

It should be noted that the fabricating process merely comprises the steps of coating the ultraviolet curable coating on the surface of the bottle-shaped container body 2 and irradiating the ultraviolet rays over the surface of the body 2 resulting in a simple process.

It should be appreciated from the foregoing description that, since the bottle-shaped container 1 of the present invention is thus coated and treated simply, the mechanical strength of the container surface can be enhanced while various advantageous superior characteristics of polyethylene terephthalate resin are retained. The surface thereof thus becomes difficult to scratch and even more difficult to obviously scratch, thus preventing the deterioration of the surface or external appearance thereof due to fine scratches. Since the surface of the bottle-shaped container of the present invention thus becomes very flat and smooth, it is difficult to contaminate, and further that, since it can be simply treated, it is proper for mass production.

Figure 3:
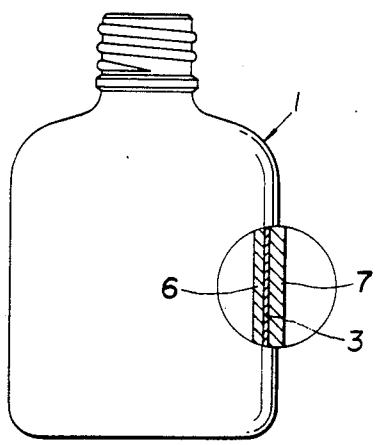
FIG. 3 is a view similar to FIG. 1, but including a partially enlarged cross sectional view of the body wall of another embodiment of the bottle-shaped container.

FIG. 3 shows another embodiment of the bottle-shaped container according to the present invention. On the bottle-shaped container body 2 thus coated with the hard coating 3 is further integrally coated a transparent resin coating or film 7, which is highly crosslinked and has a hard surface, via the hard coating 3 or transparent primer layer on the outer surface of bottle-shaped container wall 6.

The resin coating 7 thus further coated on the body 2 of the bottle-shaped container 1 having a highly crosslinked hard surface exhibits superior surface hardness while retaining the high transparency of the saturated polyester of the bottle-shaped container wall 6 due to the coexistence of the hard coating or primer layer 3 and the resin coating 7.

It is noted that although the preferred embodiment of the bottle-shaped container of the present invention has been described in the case of integrally forming a transparent resin coating providing a hard surface on the entire surface of the saturated polyester bottle-shaped container body including the side wall and the bottom, such hard coating may at least be formed on the side wall of the outer surface of the container and may also be formed on the entire surface of the bottle-shaped container, including the neck portion thereof as required.

The bottle-shaped container thus constructed can be fabricated by a fabricating method to be described as below.

This method comprises a first step of producing a saturated polyester bottle-shaped container from saturated polyester material, known per se.

The second step comprises passing the transparent saturated polyester bottle-shaped container thus produced through a cleaning tank which does not affect the bottle-shaped container itself such as, for example, fluorine solvent or the like. This removes fingerprint, dusts, etc. adhered onto the external surface of the bottle-shaped container, providing a uniform primer layer on the surface of the bottle-shaped container.

The third step comprises coating a coating containing a polymer selected from the group consisting of ethylene-vinyl acetate copolymer, vinyl chloride polymer, vinyl acetate polymer, vinyl chloride-vinyl acetate copolymer, isocyanate polymer and chlorinated polyethylene polymer on the external surface of the side wall and bottom of the saturated polyester bottle-shaped container thus passed as above and preliminarily drying the bottle-shaped container thus coated as required to thereby form a primer layer of transparent coating of approx. 0.1 to 5μ thick.

The fourth step further comprises coating a coating containing hard surface and transparent coating forming resin and photosensitizer such as benzoyl, benzyl, benzoin methyl ether, etc. on the surface of the primer layer of the bottle-shaped container.

The fifth and final step comprises irradiating ultraviolet rays over the resin coating surface thus formed in the previous fourth step so as to introduce high crosslinking into the resin coating.

The primer layer of transparent coating as formed in the above third step is a necessary intermediate layer for rigidly and integrally forming the coating of resin having the hard surface and transparent coating forming functions on the surface of the saturated polyester bottle-shaped container. It this primer layer is not formed on the bottle-shaped container, it is impossible to form integrally the highly adhesive coating of the resin on the surface of the saturated polyester bottle-shaped container.

The hard surface and transparent coating forming resin used in the above fourth step includes, for example, unsaturated polyester resin, acrylic resin, alkyd resin, epoxy resin, urethane resin, and copolymer resin of any two or more of the above resins. In the above fifth step, the ultraviolet rays are irradiated using a high voltage mercury lamp, metal halide lamp, etc. for irradiating the ultraviolet rays of 200 nm to 600 nm in wavelength.

It should be understood from the foregoing description that, since the saturated polyester bottle-shaped container thus coated and treated according to the present invention incorporates the high transparency of the saturated polyester itself and the transparent resin coating having a highly crosslinked hard surface rigidly integral with and formed on the external surface of the side wall and bottom of the saturated polyester bottle-shaped container it possesses so hard a surface that no scratch is formed on the surface even if it is abraded by stainless steel wool or scratched by the sharp lead of a pencil of 3H to 4H hardness.

It should also be understood that since the method of fabricating the saturated polyester bottle-shaped container according to the present invention can rigidly and integrally form the superior hard surface resin coating on the surface of the saturated polyester bottle-shaped container without particularly high temperature heating in a short hardening step, it can form the superior hard surface coating even on relatively thermally deformable saturated polyester bottle-shaped containers without apprehension of thermal deformation strain of the saturated polyester bottle-shaped container adapted for mass production.

What is claimed is:

1. A saturated polyester bottle-shaped container comprising:
   a primary curable coating comprising a resin selected from the group consisting of ethylene-vinyl acetate copolymer, vinyl chloride polymer, vinyl acetate polymer, vinyl chloride-vinyl acetate copolymer, isocyanate polymer and chlorinated ethylene polymer; and
   a transparent resin coating crosslinked with said primary coating comprising a resin selected from the group consisting of unsaturated polyester resin, acrylic resin, alkyd resin, epoxy resin, urethane resin, and copolymer resins made of any combination of two or more of said transparent resins, said ultraviolet curable coating being located between said container and said transparent resin coating.

2. A container as claimed in claim 1, wherein said ultraviolet curable coating is vinyl chloride polymer.

3. A method of fabricating a saturated polyester bottle-shaped container having a side wall comprising the steps of:
   forming the container;
   cleaning the external surface of the preformed saturated polyester bottle-shaped container;
   coating a primary resin at least on the side wall of said bottle-shaped container, said resin being selected from the group consisting of ethylene-vinyl acetate copolymer, vinyl acetate polymer, vinyl chloride-vinyl acetate copolymer, isocyanate polymer and chlorinated ethylene polymer;
   further coating a transparent resin which crosslinks with said ultraviolet curable primary resin coating, said transparent resin containing photosensitizer and being selected from the group consisting of unsaturated polyester resin, acrylic resin, alkyd resin, epoxy resin, urethane resin, and copolymer resins made of any two or more of said transparent resins; and
   irradiating ultraviolet rays over the resin coatings of the bottle-shaped container.

4. A method of fabricating a saturated polyester bottle-shaped container having a side wall comprising the steps of:
   forming the container;
   cleaning the external surface of the preformed saturated polyester bottle-shaped container;
   coating a primary resin at least on the side wall of said bottle-shaped container, said resin being selected from the group consisting of ethylene-vinyl acetate copolymer, vinyl acetate polymer, vinyl chloride-vinyl acetate copolymer, isocyanate polymer and chlorinated ethylene polymer;
   further coating a transparent resin which crosslinks with said primary resin coating, said transparent resin containing photosensitizer and being selected from the group consisting of unsaturated polyester resin, acrylic resin, alkyd resin, epoxy resin, modified resins of any of said transparent resins, and copolymer resins made of any two or more of said transparent resins; and
   irradiating ultraviolet rays of 200 nm to 600 nm wavelength over the resin coatings of the bottle-shaped container with a high voltage mercury or metal halide lamp.

* * * * *